United States Patent [19]

Crofts

[11] 4,363,843
[45] Dec. 14, 1982

[54] SEALS

[75] Inventor: David Crofts, Cirencester, England

[73] Assignee: Raychem Limited, London, England

[21] Appl. No.: 129,198

[22] Filed: Mar. 11, 1980

[30] Foreign Application Priority Data

Mar. 20, 1979 [GB] United Kingdom ................ 7909832

[51] Int. Cl.³ .......................... B32B 3/02; B32B 33/00
[52] U.S. Cl. ....................................... 428/43; 102/473;
156/86; 174/DIG. 8; 428/36; 428/40; 428/332;
428/334; 428/335; 428/336; 428/347; 428/349;
428/913
[58] Field of Search .................... 428/40, 43, 156, 343,
428/347, 349, 334, 335, 128, 336, 913, 332;
156/86; 24/16 R, 16 PB; 220/DIG. 3;
229/DIG. 12; 206/497, 601; 102/473, 517;
174/DIG. 8

[56] References Cited

U.S. PATENT DOCUMENTS

| | | | |
|---|---|---|---|
| 2,027,962 | 3/1933 | Currie | 18/55 |
| 2,790,285 | 4/1957 | Pike et al. | 156/86 |
| 3,483,020 | 12/1969 | Giellerup | 428/349 |
| 3,873,018 | 3/1975 | Donnay | 428/343 |
| 4,285,746 | 8/1981 | DePuy et al. | 428/913 |

FOREIGN PATENT DOCUMENTS

| | | |
|---|---|---|
| 990235 | 7/1961 | United Kingdom . |
| 1346479 | 8/1971 | United Kingdom . |
| 1474167 | 6/1973 | United Kingdom . |
| 1495028 | 3/1975 | United Kingdom . |

Primary Examiner—Paul J. Thibodeau
Attorney, Agent, or Firm—Lyon & Lyon

[57] ABSTRACT

A recoverable seal for sealing a container, especially an artillery ordinance cannister, comprising a heat-shrinkable continuous annular band having a uniform coat of heat-activatable adhesive on the inwardly-facing surface thereof which has a mean thickness of 0.01 to 1.0 mm and differs from the mean thickness over the surface by at most 25% of the mean thickness. The band may be provided with a tearable region such as a score line to enable it easily to be peeled off the container. After the band has been recovered on the container, the band can be peeled away and a layer of adhesive will remain aiding the ability of the seal to withstand pressurization and depressurization.

10 Claims, 4 Drawing Figures

SEALS

The present invention relates to a removable seal for containers.

For some applications, there has arisen a need for a seal for a container which on the one hand should withstand severe environmental conditions and yet when required should be easily removable. One such application is in the sealing of artillary ordnance cannisters which are used to protect ammunition such as shells, mortar bombs, flares and incendiaries from moisture, fire, oils and fuels and further provide mechanical protection. Such cannisters need to be reliably sealed against very severe environmental conditions including depressurisation as experienced, for example, during air transport and yet the seal must be easily and quickly removable manually, if necessary under difficult conditions.

Accordingly the present invention provides a removable seal for sealing a joint between two parts of a container, which comprises a heat-shrinkable band having a coat of heat-activatable adhesive on one surface thereof, the coat having a mean thickness in the range of from 0.01 to 1.0 mm and differing in thickness from the mean thickness over the surface by not more than 25% of the mean thickness.

Thus it has been found that in order to provide an effective yet readily removable seal, adhesive type, thickness and uniformity all play an important role.

The expression heat activatable adhesive is employed in the conventional sense to mean an adhesive which is essentially tack-free at ambient temperature (e.g. a tack strength of 0 to 1 gf/cm$^2$ when measured on a Polyken Probe Test Tester (Hammond, ASTM Spec. Tech. Publication No. 360, pp 123–133) and yet which becomes tacky at a prescribed elevated temperature, the tackiness decaying with time at ambient temperature.

The heat activatable adhesive is preferably rubber based, e.g. Nitrile rubber, perferably an acrylonitrile rubber, chloroprene rubber (particularly with medium to high crystallisation rates) or a polyurethane rubber, or is a polybutylmethacrylate preferably containing a delayed action plasticiser such as dicyclolexyl or diphenylphthalate, or may be based on a natural rubber. Nitrile rubbers have the advantage of high oil resistance, while chloroprene and polyurethane rubbers have good heat ageing characteristics, and butyl methacrylate has good low temperature properties.

Preferably the mean thickness of the adhesive coating is in the range of from 0.025 to 0.5 mm, more preferably from 0.05 to 0.25 and especially from 0.1 to 0.15 mm. Preferably also the thickness of the adhesive coat varies between its minimum and maximum by not more than 25% of the mean thickness.

It has been found that, by using a seal according to the invention, it is possible to provide a container such as an ordnance cannister with a seal that can easily be removed even under the very difficult conditions of battle but which will retain its integrity even when the exterior of the container is depressurised to about 0.5 atmospheres a number of times. This is especially important in the case of artillary ordnance cannisters due to the extreme sensitivity to moisture of the contents of the cannisters and due to the fact that the cannisters may be depressurised many times in air transport before they are opened.

Depressurisation of the exterior of the cannister is a particularly severe test of a seal (far more severe than pressurisation of the interior of the cannister) since, even though the seal may cover a large area of the cannister on either side of the joint and so provide an adequate sealing effect at atmospheric pressure, when the atmospheric pressure is reduced any small pockets of air that are trapped between the external surface of the cannister and the overlying seal will expand and, in so doing, cause the seal to peel away from the cannister surface. Even after depressurisation for a short length of time the expanded pockets of air or "blisters" will provide a pathway for moisture to enter the cannister underneath the seal.

According to the present invention, the uniformity of the layer of heat-activatable adhesive substantially entirely prevents the formation of such air pockets and so provides a reliable seal. Moreover, it is possible to form a seal that is easily removable to allow the cannister to be opened by arranging for the heat activatable adhesive to adhere (after activation) to a metallic substrate, i.e. the cannister, in preference to the band, so that, after the band has been recovered onto the substrate (cannister), the band can be peeled away and a layer of adhesive will remain on the substrate usually in the form of a thin membrane. The adhesive bond between the band and the substrate (which will be determined by the adhesive strength of the bond of the band to the heat activatable adhesive) is advantageously in the range of from 3 to 15, preferably 5 to 10 N/25 mm in order to allow the band to be peeled away easily. Since the heat-activatable adhesive is only in the form of a thin membrane, it can easily be ruptured along the joint after the band has been removed, for example by twisting each part of the container with respect to the other part.

Preferably the sealing band is in the form of a heat shrinkable sleeve which can be located around the area of the container to be sealed and then shrunk down by heating, simultaneously activating the adhesives. Preferably also, the sleeve is provided with a tearable region, for example a line of weakness such as a score line that extends across the band, or a tear-off tab adjacent to a slot e.g. a slot of keyhole shape, to enable the sleeve to be torn across its width and so facilitate removal.

The sealing band may be constructed of any material capable of exhibiting heat recoverable properties. Heat-recoverable articles may be produced by deforming a dimensionally heat stable configuration to a dimensionally heat unstable configuration, in which case the article will assume, or tend to assume, the original heat stable configuration on the application of heat alone. According to one method of producing a heat recoverable article, a polymeric material is first extruded or moulded into a desired shape. The polymeric material is then cross-linked or given the properties of a cross-linked material by exposure to high energy radiation for example a high energy electron beam or atomic pile radiation. The cross-linked polymeric material is heated and deformed, and then locked in the deformed condition by quenching or other suitable cooling means. The deformed material will retain its shape almost indefinitely until exposed to a temperature above its crystalline melting temperature, for example about 120° C. in the case of polyethylene. Examples of heat-recoverable articles may be found in U.S. Pat. No. 2,027,962 and in UK Pat. No. 990,235, the disclosures of which are incorporated herein by reference. As is made clear in U.S. Pat. No. 2,087,962, however, the original dimensionally stable heat-stable configuration may be a transient form in a continuous process in which, for example an extruded tube is expanded, whilst hot, to a dimensionally heat unstable form. Preferred materials are cross-linked thermoplastics such as polyolefins especially polyethylene, polyvinyl chloride and heat shrinkable cross-linked blends of thermoplastics e.g. blends of polyethylene with ethylene/vinylacetate copolymers, poly 2-chlorobutadienes (e.g. polychloroprene—trade name—available from DuPont) and copolymers of vinylidene fluoride with at least one fluorinated olefin such as hexafluoropropylene, tetrafluoroethylene or 1-hydropentafluoropropene (e.g. the fluorinated elastomers available from Dupont under the trade name Viton). Particularly preferred materials are heat shrinkable cross-linked polyethylene and blends of polyethylene with ethylene/vinyl acetate copolymers.

The seal may be manufactured by forming a tube from a polymeric material that can be rendered heat-recoverable by deformation, expanding the tube radially to render it heat-recoverable, passing the tube through a bath of heat activatable adhesive in the liquid state, preferably in solution, withdrawing the tube from the bath so that a coat of the adhesive having a thickness in the range of from 0.01 to 1.0 mm remains on the tube, cutting the tube to form a plurality of annual bands, and distorting the bands so that the coated surfaces face inwards. It is possible to ensure that the coat of adhesive has the desired thickness and uniformity by controlling the variables such as the viscosity of the adhesive solution, its solids content, its temperature and the speed of withdrawal of the tube from the solution.

One embodiment of the invention will now be described in detail by way of example with reference to the accompanying drawings wherein.

Figure 1:
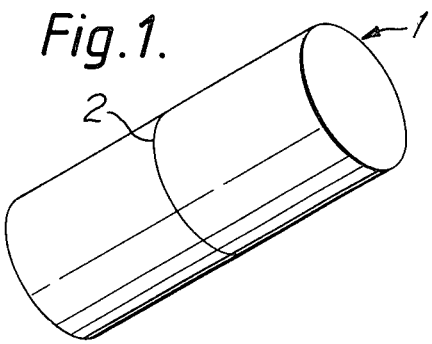
FIG. 1 is a diagrammatic isometric view of a cannister to be sealed.

With reference to the accompanying drawings there is shown an aluminium cannister 1 comprising two removable halves which mechanically interlock along a circumferential joint 2.

The cannister 1 is provided over the joint 2 thereof with a removable environmental seal 3.

The seal 3 comprises a heat shrinkable cross-linked polyethylene sleeve coated on the inner, sealing surface thereof with a heat activatable adhesive of thickness 0.2 mm ± 0.05 mm and provided with two "tear-off" tabs 5 with a keyhole slot 4 therebetween.

Figure 2:
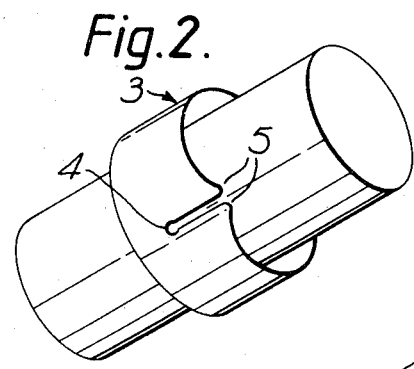
FIG. 2 is a diagrammatic isometric view of a sealing band located around the cannister of FIG. 1.
Figure 3:
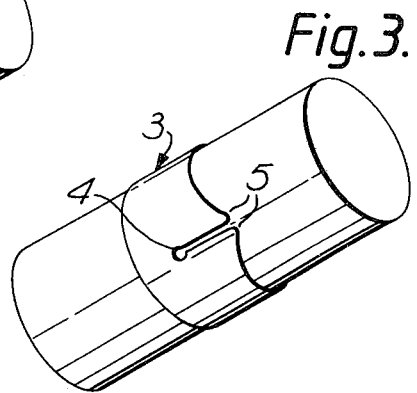
FIG. 3 is a diagrammatic isometric view of the sealing band of FIG. 2 installed on the cannister.
Figure 4:
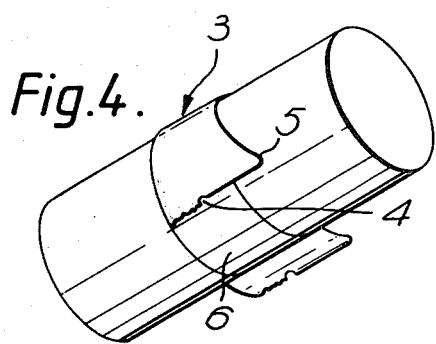
FIG. 4 is a diagrammatic isometric view of the sealing band of FIG. 2 having been partially removed.

The sleeve 3 in expanded form is located around the cannister joint 2 as shown in FIG. 2 and shrunk by heating with a hot air gun at a temperature of between 125° and 175° C. The applied heat also activates the adhesive coating rendering it tacky so that when the sleeve 3 has shrunk down into contact with the cannister as shown in FIG. 3 an adhesive seal is formed therebetween.

The seal may be removed by hand simply by pulling one of the tabs 5 to tear the sleeve axially and then pulling the sleeve away from the cannister to leave a thin film or membrane 6 of heat activatable adhesive around the joint. The film or membrane can be ruptured by giving the halves of the cannister a slight twist.

The adhesive is applied to the inner surface of the sleeve from solution by a dip-coating process in which a heat recoverable tube is passed through the adhesive solution, withdrawn from the solution at a rate of about 1 meter/minute and passed through a drying tower in which solvent was evaporated by passing a current of air over the tube.

The tube is then chopped into a number of bands and each band was "turned inside out" so that the coat of adhesive is located on the inwardly facing surface.

The following adhesive formulation was used:

| FORMULATION 1 | | |
|---|---|---|
| Hycar 1432 | (trade name for a medium-high nitrile content acrylonitrile-butadiene rubber commercially available from B.F. Goodrich Chemical Co). | 5 parts by wt |
| VMCH | (trade name for a polyvinyl chloride resin commercially available from Union Carbide) | 2.5 parts by wt |
| Schenectady SP-12 | (trade name for a phenolic resin commercially available from Schenectady Chemicals Inc.) | 2.5 parts by wt |
| and | methylethylketone | 90.0 parts by wt |

The applied seal resisted the following tests:
(a) depressuration to 500 mm hg for 72 hours.
(b) fluid immersion in accordance with ASTM D-471 for 24 hours.
(c) direct flame for 1 minute.

The seal has a pull off force of between 10 and 15 N/25 mm.

The following formulations were also used to prepare other examples of seals according to the invention:

| | Parts by weight |
|---|---|
| FORMULATION 2 | |
| Polychloroprene | 100.0 |
| p.-tert. butyl phenol | 50.0 |
| magnesium oxide | 3.0 |
| zinc oxide | 5.0 |
| antioxidant (Nonox OD - trade mark) | 1.5 |
| methylethylketone | 200.0 |
| FORMULATION 3 | |
| Milled Pale Crepe (natural rubber) | 100.0 |
| Poly B-pine resin (picopale - trade mark) | 60.0 |
| trimethyl dilycloroquinolene | 2.0 |
| zinc oxide | 5.0 |
| petroleum spirit | 200.0 |

Adhesive formulations 2 and 3 could be applied to the heat-shrinkable tube in the same manner as formulation 1, and also provided a satisfactory seal.

I claim:

1. A removable seal for a metallic substrate which comprises a heat-shrinkable continuous annular band having a tearable region therein and a uniform coat of heat-activatable adhesive on the inwardly facing surface thereof, which adhesive has a mean thickness in the range of from 0.01 to 1.0 mm, and differs in thickness from the mean thickness over the surface by not more than 25% of the mean thickness, and will adhere to a metallic substrate in preference to the band so that, after the band has been recovered onto a metallic substrate, the band can be peeled away from the substrate and a layer of adhesive will remain on the substrate.

2. A seal as claimed in claim 1 wherein the adhesive comprises a material selected from the group consisting of nitrile rubbers, a chloroprene rubber, a polyurethane rubber, and polybutylmethacrylate.

3. A seal as claimed in claim 1, wherein the mean thickness of the adhesive coat is in the range of from 0.025 to 0.5 mm.

4. A seal as claimed in claim 1, wherein said tearable region extends across said band.

5. A seal as claimed in claim 1, wherein the tearable region comprises a line of weaknesses that extends across the band.

6. A removable seal for an ordnance container to protect the ordnance against severe environmental conditions including pressurization and depressurization comprising: a continuous heat shrinkable annular band, said annular band having a tearable region therein and a uniform coat of heat activatable adhesive on the inner surface thereof so that at no point in the band does the adhesive thickness vary from the mean thickness by more than 25%, said mean thickness being in the range of 0.01 to 1.0 mm, and said adhesive being of the type which remains adhesive to the ordnance container after the band has been peeled away.

7. A seal as claimed in the 6, wherein the adhesive comprises a material selected from the group consisting of nitrile rubbers, a chloroprene rubber, a polyurethane rubber, and polybutylmethacrylate.

8. A seal as claimed in claim 6, wherein the mean thickness of the adhesive coat is in the range of from 0.025 to 0.5 mm.

9. A seal as claimed in claim 6, wherein said tearable region extends across said band.

10. A seal as claimed in claim 6, wherein the tearable region comprises a line of weaknesses that extends across the band.

* * * * *